United States Patent [19]
Blanz

[11] Patent Number: 6,041,808
[45] Date of Patent: Mar. 28, 2000

[54] COMPRESSED AIR CONTROL DEVICE FOR A SOURCE OF COMPRESSED AIR ON MOTOR VEHICLES

[75] Inventor: Roland Blanz, Heiligkreuzsteinach, Germany

[73] Assignee: Grau GmbH, Heidelberg, Germany

[21] Appl. No.: 09/035,314

[22] Filed: Mar. 5, 1998

[30] Foreign Application Priority Data

Mar. 12, 1997 [DE] Germany .......................... 197 10 059

[51] Int. Cl.[7] ................................................. G05D 16/20
[52] U.S. Cl. ................................ 137/118.06; 137/115.19; 137/115.23; 137/115.25; 137/881; 137/883; 137/885; 34/80
[58] Field of Search .............................. 137/883, 118.06, 137/881, 885, 115.19, 115.23, 115.25; 34/80

[56] References Cited

U.S. PATENT DOCUMENTS

| | | | |
|---|---|---|---|
| 3,785,393 | 1/1974 | Tanguy ........................... | 137/118.06 X |
| 3,786,828 | 1/1974 | Krechel ........................... | 137/115.19 X |
| 4,054,327 | 10/1977 | Rebenstorf ..................... | 137/118.06 X |
| 4,476,889 | 10/1984 | Haynes ........................... | 137/118.06 X |
| 4,733,696 | 3/1988 | Baun ................................ | 137/883 |
| 4,936,026 | 6/1990 | Cramer et al. ................... | 34/80 X |
| 5,566,717 | 10/1996 | Robert ............................. | 137/883 |
| 5,592,754 | 1/1997 | Krieder et al. .................. | 34/80 X |
| 5,678,900 | 10/1997 | Blanz .............................. | 137/118.06 X |
| 5,917,139 | 6/1999 | Godell et al. .................... | 96/113 |

FOREIGN PATENT DOCUMENTS

| | | |
|---|---|---|
| 44 21 575 A1 | 1/1996 | Germany . |
| 196 49 498 C1 | 2/1998 | Germany . |

Primary Examiner—John Fox
Assistant Examiner—John Bastianelli
Attorney, Agent, or Firm—Thomas, Kayden, Horstemeyer & Risley

[57] ABSTRACT

A compressed air control device for a source of compressed air on motor vehicles, forming a unit of an electro-pneumatic unloader, an integrated electro-pneumatic multi-circuit control valve and an air-drier, comprising an inlet and an outlet provided in a common housing in which a chamber for the passage of compressed air is provided, the chamber being connected to the atmosphere via a controlled outlet valve in form of a safety valve in its opened position, a check valve being positioned downstream of the chamber, a means for alternatingly opening and closing the outlet valve and a plurality of control units of the same kind allocated to the respective circuits, the control units each comprising a check valve closing contrary to the flow direction and a means for controlled opening of the check valve. A mechanical-pneumatic unloader is integrated in addition to the electro-pneumatic unloader, the function of the mechanical-pneumatic unloader being locked in case of the source of compressed air being correctly supplied with power. The mechanical-pneumatic unloader is also designed as an on-off valve for the activation of a regeneration phase of the air-drier after the outlet valve being opened.

11 Claims, 2 Drawing Sheets

COMPRESSED AIR CONTROL DEVICE FOR A SOURCE OF COMPRESSED AIR ON MOTOR VEHICLES

FIELD OF THE INVENTION

This invention relates to a compressed air control device for a source of compressed air on motor vehicles forming a unit of an electro-pneumatic unloader, an integrated electro-pneumatic multi-circuit control valve and an air-drier, comprising an inlet and an outlet provided in a common housing in which a chamber for the passage of compressed air is provided, the chamber being connected to the atmosphere via a controlled outlet valve in form of a safety valve in its opened position, a check valve being positioned downstream of the chamber, a means for alternatingly opening and closing the outlet valve and a plurality of control units of the same kind assigned to the respective circuits, the control units each comprising a check valve closing contrary to the flow direction and a means for controlled opening of the check valve. Mechanical-pneumatic valves and control units are supposed to be especially safe in operation, whereas the safety in operation of electro-pneumatic parts are often doubted. In case of an interruption of power supply on the vehicle all electro-pneumatic parts fail.

BACKGROUND OF THE INVENTION

An electro-pneumatic compressed air control device of the type mentioned above is known from DE 44 21 575 A1. In a common housing an electro-pneumatic unloader as well as an electro-pneumatic multi-circuit control valve and an air-drier are provided. As control units for the unloader on the one hand and the different circuits of the multi-circuit control valve on the other hand, similar elements are provided in form of a check valve closing contrary to the flow direction. An actuation means consisting of a piston with a rod is associated to the check valve, the piston also being electrically controlled. The check valve of the unloader is an outlet valve in form of a safety valve opening to the atmosphere, whereas the check valve of the multi-circuit control valve opens to the different operation circuits. The check valve of the unloader can e.g. comprise an opening pressure of 13 bar which at the same time is the safety pressure of the compressed air control device. If for any reasons a higher pressure occurs in the chamber of the compressed air control device, the check valve of the unloader opens and limits the pressure in the chamber to the adjusted safety pressure. The check valves associated to the single circuits are also adjusted and in that way determine the corresponding circuit safety pressure. The adjustment of the check valves of the multi-circuit control valve with respect to the adjustment of the check valves of the unloader is problematic. When the check valves of the multi-circuit control valves are adjusted relatively high, e.g. to an opening pressure of 10 bar, in case of an interruption of the electronic a refillable container pressure of only 13 bar −10 bar=3 bar results. When the check valves of the circuits are adjusted relatively low, e.g. to an opening pressure of 3 bar, in case of an interruption of one of the circuits because of leakage, also the intact circuits can only be refilled with a pressure of 3 bar. Both defects, power interruption on the one hand and leakage in one circuit on the other hand, are realistic cases of damages and dangers. In the known compressed air control device an interruption of power on the one hand results in the described emergency features and on the other hand in the regeneration of the air-drier not taking place any more. When the vehicle is driven without power supply of the compressed air control device over a longer period of time this can lead to freezing of the non-regenerated air-drier in case of low temperatures and consequently to a total fail of the braking system.

In the German patent application 196 49 498.2 it has already been proposed to additionally integrate a mechanical-pneumatic unloader to the electro-pneumatic unloader, the mechanical-pneumatic unloader being adjusted to a switch-off pressure substantially higher than the switch-off pressure of the electro-pneumatic unloader. In that way the mechanical-pneumatic unloader is designed as on-off valve for turning on the regeneration phase of the air-drier after obtaining its switch-off pressure. The outlet valve in form of a safety valve is adjusted to a higher opening pressure than the switch-off pressure of the mechanical-pneumatic unloader. In this way additional to the electro-pneumatic unloader a mechanical-pneumatic unloader is integrated in the compressed air control device. While until now in the state of the art the development was to replace the mechanical-pneumatic unloader by an electro-pneumatic unloader, with respect to the defects described above, a mechanical-pneumatic unloader is chosen, the mechanical-pneumatic unloader being additionally provided to the electro-pneumatic unloader. In case of an intact device, which means correct power supply, the compressed air control device operates by means of the electro-pneumatic unloader. The mechanical-pneumatic unloader is not active, because its switch-off pressure is adjusted substantially higher than the switch-off pressure of the electro-pneumatic unloader. A substantially higher adjustment means an adjustment comprising a difference to the switch-off pressure of the electro-pneumatic unloader, so that e.g. in case of friction in the pneumatic part of the electro-pneumatic unloader, this cannot lead to an activation of the mechanical-pneumatic unloader. The mechanical-pneumatic unloader is only supposed to operate in case of a power interruption. It is clear that in case of correct power supply a correct regeneration of the air-drier in the known fashion takes place. But also in case of power interruption and controlling of the supply of the circuits by the mechanical-pneumatic unloader, a cyclic regeneration of the air-drier takes place. For this the mechanical-pneumatic unloader is also designed as an on-off valve for starting the regeneration phase of the air-drier. This regeneration phase takes place after achieving the switch-off pressure of the mechanical-pneumatic unloader. The outlet valve in form of a safety valve of the electro-pneumatic unloader is further adjusted to a higher opening pressure than the switch-off pressure of the mechanical-pneumatic unloader. This increased adjustment with respect to the state of the art is advantageous.

Thus, it is an object of this invention to provide an electro-pneumatic compressed air control device of the type described above, comprising an unloader, a multi-circuit control valve and an air-drier, the compressed air control device not only providing a filling of the circuits in case of power interruption but also enabling a regeneration of the air-drier in cases of intentional or unintentional power interruption.

SUMMARY OF THE INVENTION

This object is achieved in a compressed air control device of the type mentioned above by a mechanical-pneumatic unloader being integrated additionally to the electro-pneumatic unloader, the mechanical-pneumatic unloader being locked in case of the source of compressed air being correctly supplied with power, and the mechanical-pneumatic unloader also being designed as an on-off valve for the activation of a regeneration phase of the air-drier after the outlet valve being opened.

This invention starts with the idea to at least rudimentarily integrate a mechanical-pneumatic unloader in the compressed air control device additional to the electro-pneumatic unloader, the function of the mechanical-pneumatic unloader being locked in case of correct power supply. In all cases of correct power supply of the compressed air control device and its control and monitoring unit, respectively, the mechanical-pneumatic unloader does not have an effect. When power supply fails, either in an emergency case because of a defect or intentionally, e.g. during driving by pulling out of the ignition key in order to turn the motor off, the resulting interruption of power supply is sensibly used in now the mechanical-pneumatic unloader fulfilling the function. What substantially matters is that a complete idle phase for a regeneration of the air-drier takes place. It is supposed to be ensured that, e.g. in case of parking of a vehicle, the regeneration phase is intentionally controlled by the mechanical-pneumatic unloader in order to dehumidify the air-drier completely. When this is achieved, problems concerning antifreezing in case of low temperatures in winter are avoided. It is especially advantageous to chose the switching span of the mechanical pneumatic unloader bigger than the switching span of the electro-pneumatic unloader, so that in case of power interruption an especially intensive regeneration phase takes place which does not have any negative effects because it is possible to reduce the container pressure due to an increased switching span in case of a parked vehicle. The possibility of designing the mechanical-pneumatic unloader as on-off valve for starting the regeneration phase can be used. There is no necessity for a special on-off valve.

The switch-off pressure of the mechanical-pneumatic unloader should be adjusted about as high or lower than the switch-off pressure of the electro-pneumatic unloader, the outlet valve being formed as a safety valve being adjusted to an opening pressure higher than the switch-off pressure of the electro-pneumatic unloader. When the switch-off pressure of the mechanical-pneumatic unloader is adjusted as high as the switch-off pressure of the electro-pneumatic unloader, the pressure containers of the circuits are also safe in case of a defect, that means an interruption of power supply due to a defect. Even then the entire pressure is available. Also the switching span and also the -on pressure determined with respect to the switch-off pressure can be the same as on the electro-pneumatic unloader, so that in that way there are no disadvantages concerning the supply of compressed air even in cases of defects. In such a case it would make sense to provide a signal concerning the defect of power supply for the driver, because the driver is not able to figure out this defect from the reactions of the vehicle. This has to be considered differently when the switching span of the mechanical-pneumatic unloader is intentionally chosen bigger or the switch-off pressure of the mechanical-pneumatic unloader is determined lower than the switch-off pressure of the electro-pneumatic unloader. In this case a sensitive driver can feel differences without the danger of the vehicle not being handable any more. In different cases the switching span of a mechanical-pneumatic unloader should be big enough to realize an especially intensive and long-lasting regeneration phase in case of power interruption, the regeneration phase advantageously taking place always in cases of the vehicle being parked.

The mechanical-pneumatic unloader may comprise a piston supported on a spring, the piston after moving over an ineffective part of its stroke opening a closed overflow valve in order to open the controlled outlet valve of the electro-pneumatic unloader to run in the idle phase. It is sufficient to provide the mechanical-pneumatic unloader rudimentarily and to control the control unit of the outlet valve, being part of the electro-pneumatic unloader, also by the mechanical-pneumatic unloader, so that there is no necessity of two adjacent outlet valves.

A regeneration line for the regeneration of the air-drier can start from a line which leads from the mechanical-pneumatic unloader to the control outlet valve, a check valve being provided in the regeneration line. Thus, the mechanical-pneumatic unloader is also capable of controlling a regeneration phase. The check valve prevents a part of the piston of the mechanical-pneumatic unloader from being biased by the entire container pressure.

The spring of the piston may be supported on a locking piston, a locking chamber being biasable by the locking valve being associated to the locking piston, the locking valve taking its passage position in case of power supply in excitation. It is clear that the locking chamber is always biased when the function of the mechanical-pneumatic unloader is supposed to be suppressed. On the other hand it has to be ensured that in case of a power interruption the locking valve also takes its locking position and effects a venting of the locking chamber in order to enable a correct operation of the mechanical-pneumatic unloader in this case.

It is possible to provide the solenoid valve controlling the regeneration in case of power supply of the source of compressed air as locking valve. Thus, this solenoid valve that exists anyway is used for a second function and there is no necessity for another locking valve.

A locking valve can be located in a line leading to the piston, the locking valve locking in case of power supply of the source of compressed air and taking its passage position in case of no power supply of the source of compressed air. The locking valve is arranged in a line leading from the chamber after the check valve to the chamber of the piston of the mechanical-pneumatic unloader. The locking piston may be formed by two separated pistons supporting each other and in that way two locking chambers may be provided, one locking chamber being connected to the room surrounding the valve magnet and the other locking chamber being connected to the room surrounding the valve magnet of the solenoid valve. The solenoid valve controls the regeneration in case of correct power supply.

It is further possible to provide a particular locking valve being formed as a solenoid valve, the locking valve being located in the line leading from the chamber to the locking chamber of the locking piston. In this case the locking valve has to be designed with its two switching positions differently and inversely, respectively, with respect to the embodiments described above. In case of power supply it has to take its passage position. In case of power interruption it has to enable a venting of the locking chamber in order to cancel the locking of the mechanical-pneumatic unloader.

BRIEF DESCRIPTION OF THE DRAWINGS

The invention is explained and described in detail by means of preferred embodiments. In the drawings.

DETAILED DESCRIPTION

Figure 1:
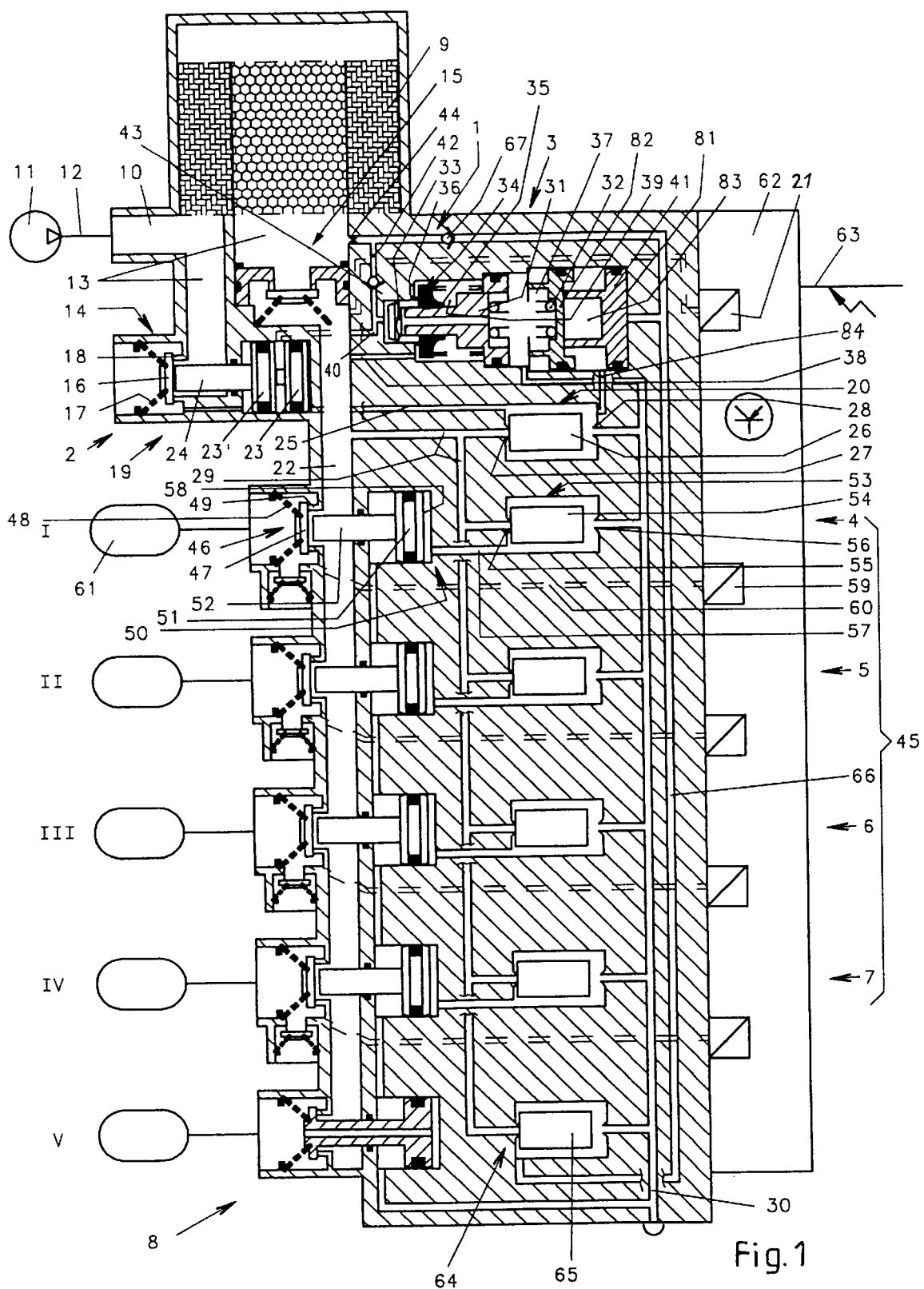
FIG. 1 shows a schematic view of the compressed air control device for a source of compressed air in a first embodiment.

In FIG. 1 the compressed air control device is illustrated by means of a first embodiment. In a common housing 1 an electro-pneumatic unloader 2, a rudimentary mechanical-pneumatic unloader 3, a control unit 4, 5, 6, 7, 8 for single circuits and an air-drier 9 are integrated. On the housing 1 an inlet 10 is provided, compressed air being led from a compressor 11 via a line 12 and the inlet 10 to the source of compressed air. A chamber 13 is connected to the inlet 10, the chamber 13 leading to a controlled outlet valve 14 and via the air-drier 9 to a check valve 15. The controlled outlet valve 14 is designed as a safety valve. Similar to a check valve it comprises a valve body 16 which is supported on a adjustable spring 17. The valve body 16 works together with a seat 18. Depending on the adjustment of the spring 17 a safety pressure can be adjusted at the outlet valve 14. The outlet valve 14 leads to the atmosphere and prevents the occurrence of a pressure in the chamber 13 being higher than the adjusted safety pressure. The outlet valve 14 is a functional part of the electro-pneumatic unloader 2 as well as of the mechanical-pneumatic unloader 3. If considered as a structural part of the electro-pneumatic unloader 2, the functional integration of the mechanical-pneumatic unloader 3 can be called a structural integration of the actuation piston of such a mechanical-pneumatic unloader 3. The electro-pneumatic unloader 3 further comprises a means 19 for alternatingly opening and closing the outlet valve 14. Further components of the electro-pneumatic unloader 2 are a solenoid valve 20 and a pressure sensor 21 being connected to a chamber 22 after the check valve 15. The means 19 for alternatingly opening and closing comprises a first piston 23 and a second piston 23' with a rod 24 in order to push open the valve body 16 of the outlet valve 14. A line 25 leads from the solenoid valve 20 to the control chamber associated to the piston 23. The solenoid valve 20 comprises a valve magnet 26, an inlet seat 27 and an outlet seat 28. The inlet seat 27 is constantly connected to the chamber 22 via a line 29. The outlet seat 28 is connected to a venting line 30.

The mechanical-pneumatic unloader 3 being rudimentary with respect to its structure comprises a piston 31 being guided in a bore of the housing by means of a sealing, the piston 31 being supported on a spring 32. The piston 31 is elongated one-piece to an actuation rod 33 which actuates an overflow valve 34 formed by a valve body 35 and a seat 36 on side of the housing 1. The piston 31 is formed hollow for reasons of venting. The spring chamber 37 is also connected to a venting line 30. The effective area of the piston 31 is constantly connected to the chamber 22 via a line 38, so that the pressure of the chamber 22 prevails in the chamber 39. Beyond the overflow valve 35 a line 40 branches off the mechanical-pneumatic unloader 3 which leads to the air-drier 9 and to a control chamber of the piston 23'.

In this case the spring 32 is not supported on the housing 1 but on a locking piston 41. The locking piston 41 comprises a locking chamber 81 which can be aerated with compressed air from the chamber 22 after the check valve 15 by the solenoid valve 64. Aeration only takes place in case of according power supply. By this aeration the spring 32 is either completely pushed together or an extension of the locking piston 41 or a plate located in between gets in contact with the piston 31 of the mechanical-pneumatic unloader 3. In that way the piston 31 is not capable of fulfilling any movements and there is no possibility of the double valve body 35 taking its opened position. The spring chamber 35 is connected to the venting line 30 and therewith constantly vented. It is also possible to arrange two locking pistons 41 and 82 in line comprising the same diameter, which means to arrange two effective areas of the same size in line, as this is illustrated in FIG. 1. Thus, a second locking chamber 83 is formed between the locking pistons 41 and 82, the locking chamber 83 being connected to the chamber surrounding the valve magnet 26 and by that also to the line 25. This is an improve of safety. In case of according power supply and controlling of the idle phase by the electro-pneumatic unloader 2, which means that the solenoid valve 20 is excited, also the locking chamber 83 is aerated. In this case it is ensured that the mechanical-pneumatic unloader 3 is locked.

Instead of a single locking piston 41 or the double arrangement of two locking pistons 41 and 82 in line it is also possible to make use of a step piston. In this case the spring 32 is supported on a step piston of which the effective areas away from the spring now can form the two locking chambers 81 and 83.

The line 40 continues in a regeneration line 42 in which a check valve 43 and a throttle 44 are located. The regeneration line 42 leads to the outlet valve 14 via the air-drier 9 and serves for regeneration of the air-drier 9.

The control units 4, 5, 6, 7, 8 are designed identically or similarly and constitute the electro-pneumatic multi-circuit control valve 45. The control units 4, 5, 6 and 7 are designed identically and may be associated to the circuits I, II, III and IV. To make it easier only the control unit 4 is described in detail. The control unit 4 comprises a check valve 46 which has a valve body 47 being supported on a adjustable spring 48 and working together with the seat 49. An actuation means 50 is associated to the check valve 46, the actuation means 50 comprising a piston 51 and a rod 52. The rod 52 serves for actuation of the check valve 46. The control unit 4 further comprises a solenoid valve 53 with a valve magnet 54, an inlet seat 55 and an outlet seat 56 also being connected to the venting line 30 as the spring chamber 35 of the mechanical-pneumatic unloader 3. At the inlet seat 55 pressure of the line 29 prevails. A line 57 leads from the solenoid valve 53 to the effective area 58 of the piston 51 of the actuation means 50. The control unit 4 finally comprises a pressure sensor 59 measuring and monitoring, respectively, the pressure after the check valve 46 via a line 60 and by that in the container 61 of the circuit I. The pressure sensor 59 is part of a electronical control and monitoring unit 62 being schematically symbolized as an integrated part of the source of compressed air.

The control units 5, 6, 7 of the multi-circuit control valve 45 are designed, arranged and connected identically, so that it can be referred to the description of the control unit 4. Only the control unit 8 is not pre-controlled electrically. A circuit V branches off which is controlled purely mechanical-pneumatically.

The control and monitoring unit 62 is supplied with electric power via the line 63.

In the housing 1 of the compressed air control device another solenoid valve 64 comprising a valve magnet 65 is provided. The solenoid valve 64 fulfils a double function and firstly serves as locking valve for the mechanical-pneumatic unloader 3 and secondly for the regeneration of the air-drier 9. In case of the valve magnet 65 being excited, its inlet valve is opened and its outlet valve is closed, so that compressed air can flow from the chamber 22 via the line 29 and the regeneration line 66, a check valve 67 and the throttle 44 backwardly through the air-drier 9 in the regeneration phase. This happens when the compressed air control device is correctly supplied with power and when the electro-pneumatic unloader 2 has started the idle phase, which means that the outlet valve 14 is opened. When the solenoid valve 64 gets non-excited, the regeneration is ended. In case of correct power supply the idle/loading phase cycle is controlled by the solenoid valve 20 of the electro-pneumatic unloader 2. The non-excited position of the valve magnet 26 (FIG. 1) is associated to the loading phase. The excited solenoid valve 64 locks the mechanical-pneumatic unloader 3. The excited position of the valve magnet 26 is associated to the idle phase. The excited solenoid valve 64 controls the regeneration of the air-drier 9, whereas in the non-excited position no regeneration takes place. A wanted interruption of power supply, for instance by pulling off the ignition key after parking the vehicle or by e.g. periodically interrupting power supply of the compressed air control device results in the two solenoid valves 20 and 64 obtaining their non-excited position. Thus, the electro-pneumatic unloader 2 changes to the loading phase and the locking of the mechanical-pneumatic unloader 3 is cancelled, so that the mechanical-pneumatic unloader 3 now controls the loading/idle cycle. When the mechanical-pneumatic unloader 3 starts the idle phase, the regeneration phase of the air-drier 9 starts at the same time, the regeneration phase taking place according to the formation of the mechanical-pneumatic unloader 3. It is very useful to provide the mechanical-pneumatic unloader 3 with a bigger switching span between the switch-off pressure and the switch-on pressure than the electro-pneumatic unloader 2. In this way the electro-pneumatic unloader 2 can e.g. be designed and operated, respectively, at a switch-off pressure of 12 bar and a switch-on pressure of 11 bar, so that the switching span is 12 bar–11 bar=1 bar. If the mechanical-pneumatic unloader 3 is designed for a switch-off pressure of e.g. 12 bar and a switch-on pressure of 10 bar, the switching span 12 bar–10 bar=2 bar is bigger than the switching span of the electro-pneumatic unloader 2. During operation of the mechanical-pneumatic unloader 3 a relatively proceeded regeneration takes place. This is important for reasons of problems concerning antifreezing.

By this possibility described to interrupt power supply, it is further possible to intendingly interrupt power supply e.g. after each $x^{th}$ switching of the electro-pneumatic unloader 2 in order to move the mechanical-pneumatic unloader 3 and/or to achieve a switching of the valve magnet 26 of the electro-pneumatic unloader 2 and of the valve magnet 65 of the solenoid valve 64 by the mechanical-pneumatic unloader 3. In that way the operatability of the mechanical-pneumatic unloader is checked. Power supply is restored when the switch-off pressure of the mechanical-pneumatic unloader 3 is reached. This is determined by means of the pressure sensor 21.

Figure 2:
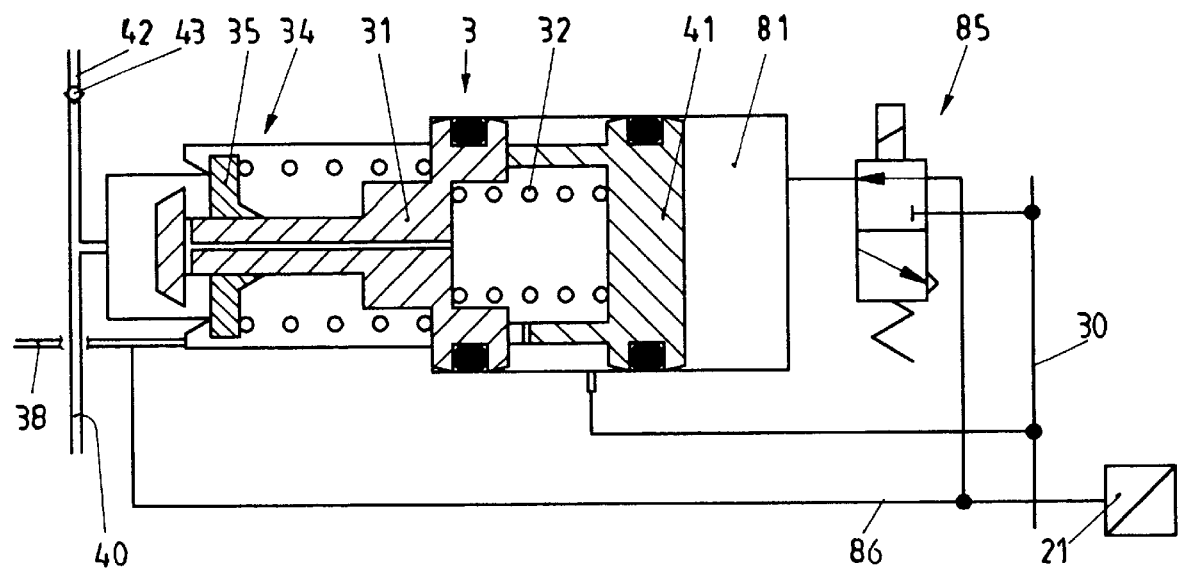
FIG. 2 shows a detailed view of another embodiment of the compressed air control device according to FIG. 1 comprising a particular locking valve.

FIG. 2 shows a detailed view of another embodiment which is to be seen in combination with the details shown in FIG. 1. Only one locking piston 41 with a locking chamber 81 in the mechanical-pneumatic unloader 3 and in association to its piston 31, respectively, is provided. A single locking valve 85 in form of a solenoid valve is located in a line 86, the line 86 leading from the chamber 22 after the check valve 15 and from the line 38 connected thereto, respectively, to the locking chamber 81. The locking valve 86 is formed and arranged to aerate the locking chamber 81 only in its excited position in case of correct power supply, so that the piston 31 of the mechanical-pneumatic unloader 3 is prevented from a movement and consequently the unloader 3 is prevented from fulfilling its function. Contrarily, if power supply is interrupted, the locking valve 85 takes its vented position, that means the locking chamber 81 is vented via the venting line 30. Thus, the piston 31 is relieved and the mechanical-pneumatic unloader 3 can fulfil its function.

Figure 3:
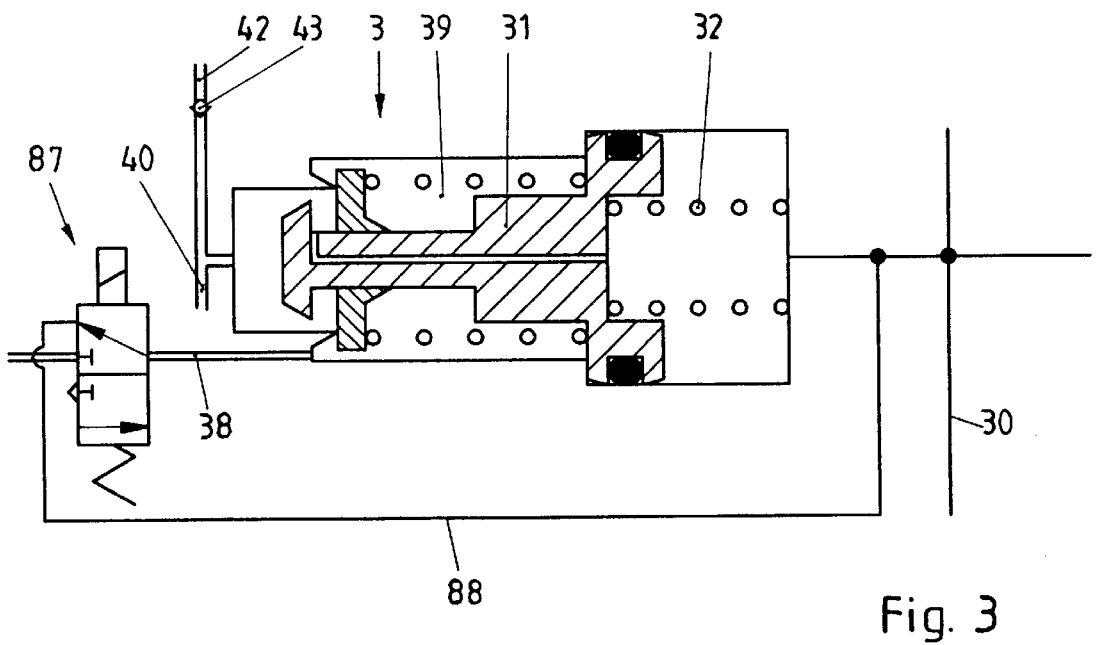
FIG. 3 shows a detailed view of another embodiment of the compressed air control device according to FIG. 1 comprising another particular locking valve.

FIG. 3 shows another single locking valve 87 also being formed as a solenoid valve and comprising the two shown positions. This locking valve 87 is located in the line 38 leading from the chamber 22 after the check valve 15 to the chamber 39 of the piston 31. In this case it is sufficient to support the spring 32 of the piston 31 on the side of the housing.

The locking valve 87 is inversely and contrarily, respectively, designed and connected like the locking valve 85 in FIG. 2. The locking valve 87 takes its venting position in its excited position which is only possible in case of correct power supply and which can only be controlled by the control and monitoring unit 62. Consequently, the part of the line 38 leading to the chamber 39 is connected to the venting line 30 via a line 88. Thus, the chamber 39 is vented in this position and the other part of the line 38 being connected to the chamber 22 is locked. In case of interruption of power supply the locking valve 87 also takes its non-excited position. Now passage in both parts of the line is possible, so that the chamber 39 comprises the pressure of the chamber 22. Consequently, the mechanical-pneumatic unloader 3 can fulfil its function correctly.

The compressed air control device according to FIG. 1 operates in case of an intact source of compressed air the way this is described in the application mentioned above. The different function resulting from the locking piston 41 is easily comprehensible from the explanations above and easily understandable for a person skilled in the art so that there is no need for further explanations. The function of the compressed air control device according to FIGS. 2 and 3 is also only mentioned briefly. The function in combination with single locking valves 85 and 87, respectively, is easily comprehensible.

While the foregoing description discloses preferred embodiments of the invention, it will be understood by those skilled in the art that variations and modifications thereof can be made without departing from the spirit and scope of the invention, as set forth in the following claims.

LIST OF REFERENCE NUMERALS:

1 housing
2 electro-pneumatic unloader
3 mechanical-pneumatic unloader
4 control unit
5 control unit
6 control unit
7 control unit
8 control unit
9 air-drier
10 inlet
11 compressor
12 line
13 chamber
14 outlet valve
15 check valve
16 valve body
17 spring
18 seat
19 means
20 solenoid valve
21 pressure sensor
22 chamber
23 piston
24 rod -continued 25 line
26 valve magnet
27 inlet seat
28 outlet seat
29 line
30 venting line
31 piston
32 spring
33 actuation rod
34 overflow valve
35 double valve body
36 seat
37 spring chamber
38 line
39 chamber
40 line
41 locking piston
42 regeneration line
43 check valve
44 throttle
45 multi-circuit control valve
46 check valve
47 valve body
48 spring
49 seat
50 actuation means
51 piston
52 rod
53 solenoid valve
54 valve magnet
55 inlet seat
56 outlet seat
57 line
58 effective area
59 pressure sensor
60 line
61 container
62 control and monitoring unit
63 electric line
64 splenoid valve
65 valve magnet
66 regeneration line
67 check valve
81 locking chamber
82 locking piston
83 locking chamber
84 line
85 locking valve
86 line
87 locking valve
88 line

I claim:

1. A compressed air control device for a source of compressed air on motor vehicles, comprising:
 a common housing including an inlet and an outlet,
 a chamber for the passage of compressed air being arranged in said common housing;
 a check valve being positioned downstream of said chamber;
 a controlled outlet valve being designed as a safety valve, said controlled outlet valve in its opened position connecting said chamber to the atmosphere;
 means for alternatingly opening and closing said controlled outlet valve;
 a plurality of circuits;
 an integrated electro-pneumatic multi-circuit control valve;
 a plurality of control units of the same kind being allocated to said circuits, each of said control units including a check valve closing contrary to the flow direction and means for a controlled opening of said check valve;
 an air-drier;
 an electro-pneumatic unloader; and
 a mechanical-pneumatic unloader being locked in case of said source of compressed air being correctly supplied with power, said mechanical-pneumatic unloader also being designed as an on-off valve for an activation of a regeneration phase of said air-drier when said controlled outlet valve is opened.

2. The device of claim 1, wherein said mechanical-pneumatic unloader has a switch-off pressure being adjusted to approximately the same value as the switch-off pressure of said electro-pneumatic unloader, and wherein said outlet valve being designed as a safety valve is adjusted to an opening pressure being higher than the switch-off pressure of said electro-pneumatic unloader.

3. The device of claim 1, wherein said mechanical-pneumatic unloader has a switch-off pressure being adjusted to a value less than the value of the switch-off pressure of said electro-pneumatic unloader and wherein said outlet valve being designed as a safety valve is adjusted to an opening pressure being higher than the switch-off pressure of said electro-pneumatic unloader.

4. The device of claim 1, wherein said mechanical-pneumatic unloader includes a piston being supported on a spring, said piston after moving over an ineffective part of its stroke opening a closed overflow valve to open said controlled outlet valve of said electro-pneumatic unloader to run in an idle phase.

5. The device of claim 1, wherein a regeneration line for the regeneration of said air-drier starts from a line leading from said mechanical-pneumatic unloader to said controlled outlet valve, and wherein a check valve is arranged in said regeneration line.

6. The device of claim 4, wherein said spring of said piston is supported on a locking piston, and wherein a locking chamber being biasable by a solenoid valve is associated to said locking piston, said solenoid valve taking its passage position in case of power supply being in excitation.

7. The device of claim 6, wherein said solenoid valve controlling the regeneration in case of existing power supply of said source of compressed air is designed as a locking valve.

8. The device of claim 4, wherein a locking valve is located in a line leading to said piston, said locking valve locking in case of existing power supply of said source of compressed air, and said locking valve taking its passage position in case of no existing power supply of said source of compressed air.

9. The device of claim 6, wherein said locking piston is formed by two separated pistons supporting each other to from a first and a second locking chambers, said first locking chambers being connected to a first room surrounding the valve magnet of said solenoid valve, and said second locking chamber being connected to second a room surrounding the valve magnet of the solenoid valve.

10. The device of claim 4, further including a special locking valve being formed as a solenoid valve, said locking valve being located in said line leading from said chamber to said locking chamber of said locking piston.

11. The device of claim 4, further including a special locking valve being formed as a solenoid valve, said locking valve being located in said line leading from said chamber to said chamber of said mechanical-pneumatic unloader.

* * * * *